March 18, 1941.   J. W. CULBERTSON   2,235,572
SEALING DEVICE
Filed Aug. 19, 1938
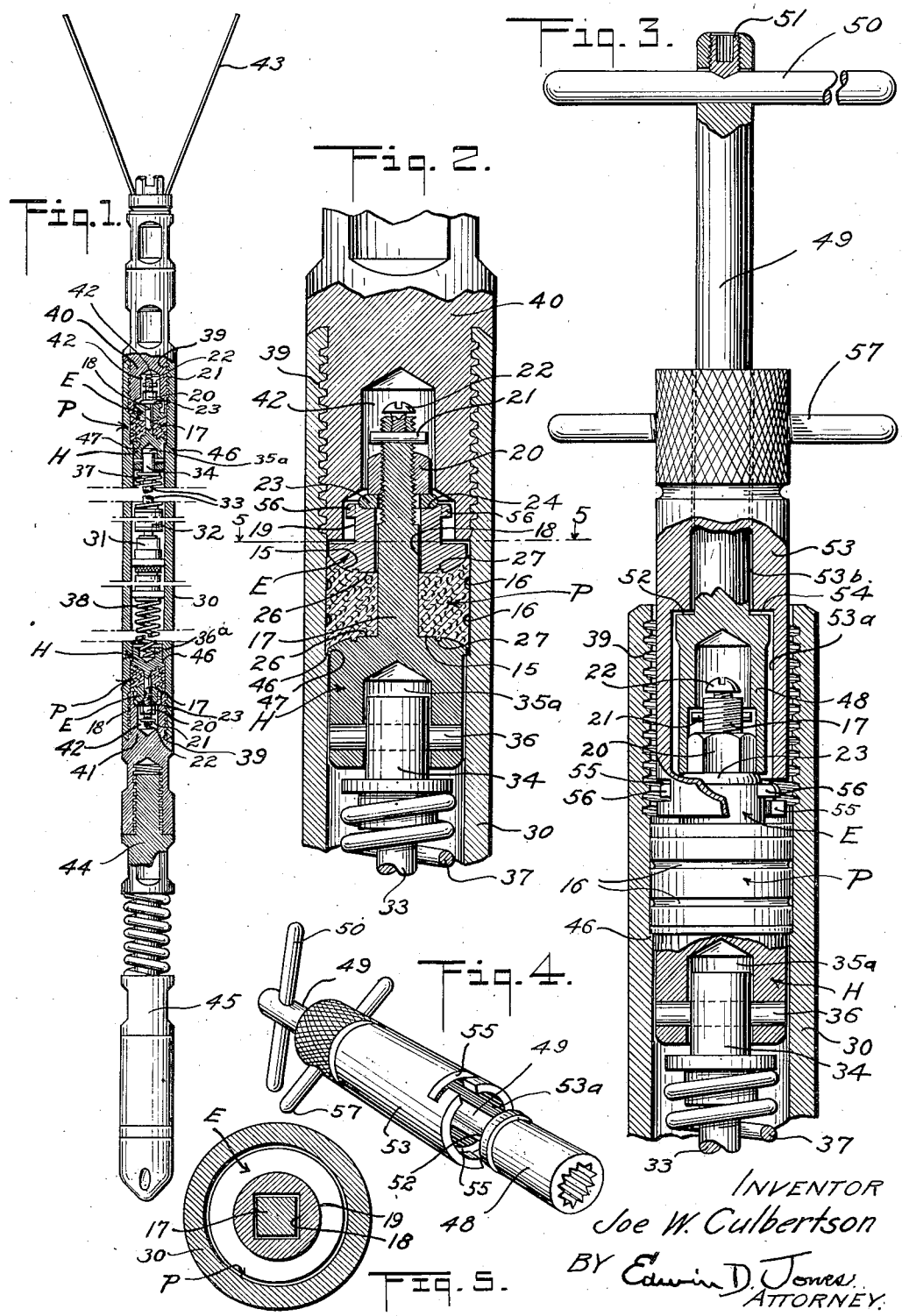
INVENTOR
Joe W. Culbertson
BY Edwin D. Jones
ATTORNEY.

Patented Mar. 18, 1941

2,235,572

UNITED STATES PATENT OFFICE 2,235,572

SEALING DEVICE

Joe W. Culbertson, West Hollywood, Calif., assignor to Technical Oil Tool Corporation, Ltd., a corporation of California Application August 19, 1938, Serial No. 225,770

4 Claims. (Cl. 138—89)

My invention relates to devices for sealing a housing containing instrumentalities of any character, against the admission of high pressure fluids, and it has particular reference, although not necessarily, to apparatus for recording the deviation of well holes from the vertical, of that character embodied in my Letters Patent No. 2,109,690, issued March 1, 1938. Such apparatus embodies a tubular housing in which is contained a recording instrument and suitable shock absorbing means therefor, and as the apparatus is adapted to be used in a drill pipe where it is subject to tremendous hydrostatic pressures, it is essential to the successful operation of the apparatus that the housing be effectively sealed against the admission of water, oil and other fluids.

It is a purpose of my invention to provide a sealing device for the housing of a bore hole deviation recording apparatus, which is characterized by the effectiveness with which it seals the housing against the admission of high pressure fluids; its structural simplicity and durability; and its ready removability when access to the housing is required.

It is also a purpose of my invention to provide a sealing device which is adjustable to establish and vary its sealing function by the provision of a novel form of tool, or by application to the apparatus housing of a closure plug. Through use of the tool such adjustment of the device can be attained as to secure that degree of sealing necessary to withstand without leakage extraordinarily high fluid pressures, while by application to the housing of the closure plug, an operation necessary to close the housing and mount certain appurtenances thereon, an adjustment of the sealing device is automatically secured sufficient in sealing effect to withstand what may be termed ordinary fluid pressures.

A further purpose of my invention is the provision of a simple and durable tool by which the required adjustment of the sealing device can be easily effected while such device is within the housing apparatus.

I will describe only one form of sealing device and tool therefor, each embodying my invention, and will then point out the novel features thereof in claims.

In the accompanying drawing:

Fig. 1 is a view showing in vertical section and partly in elevation, a bore hole deviation recording apparatus having applied thereto one form of sealing device embodying my invention.

Fig. 2 is an enlarged fragmentary sectional view of the apparatus showing the upper sealing device of Fig. 1 in section.

Fig. 3 is a view similar to Fig. 2 showing the sealing device in elevation and the operating tool applied to the device.

Fig. 4 is a detail perspective view of the tool showing in Fig. 3, but on a reduced scale.

Fig. 5 is a transverse sectional view taken on the line 5—5 of Fig. 2.

The form of sealing device exemplifying my invention is shown in Figs. 1 and 2 as comprising a packer P constructed of any suitable elastic material such as rubber, but preferably synthetic rubber as it possesses the property of not adhering to metal even under great pressures, and does not deteriorate as rapidly as rubber. This packer is, in the present instance, of ring form with normally flat sides 15 and a periphery which may be formed with annular grooves 16.

For expanding or displacing the packer P so that it is caused to function as an effective seal when applied within a housing or similar element, a stationary abutment head H and a movable expander head E are provided. As best shown in Figs. 2, the head H is formed at one side with a stem 17 which extends axially through both the packer P and the head E, the latter head having a central opening 18 for the reception of the stem. This opening 18 is bounded by a collar 19 through and from which the stem 17 extends where it is screw threaded to receive a nut 20. The nut is confined on the stem by a cross pin 21 screwed therein by a screw 22 threaded in the end of the stem. The nut 20 normally bears against a metal washer 23 seated in an annular recess 24 in the collar 19.

As shown in Fig. 5, the stem is non-circular in cross section and preferably square. Likewise, the opening in the packer P, the opening 18 in the head E and the interior of the collar 19 are all square to slidably receive the stem but prevent rotation of the latter therein. Thus when the collar 19 is held against rotation by a tool to be described hereinafter, the stem, packer and heads are secured against rotation, and thus the stem can be secured against turning to allow adjustment of the nut 20 thereon.

Again referring to Fig. 2, the confronting sides 26 of the head H are of substantially convex form to seat against the sides 15 of the packer P and they are formed with annular grooves 27 surrounding the stem.

From the preceding description it will be clear that the sealing device is operable to expand the packer radially by adjustment of the nut 20 downwardly on the stem 17. Such nut adjustment moves the heads H and E relatively and toward each other to cause the convex sides of the head H to axially compress and thus radially displace the packer against the wall of the tubular housing into which it has been inserted, thereby producing a fluid tight seal between the packer and housing.

Because of the convex contour of the sides of the head H the greatest compression of the packer occurs at the center decreasing as it proceeds to the periphery to secure maximum radial displacement thereof with a given compressing movement of the heads. This mode of displacement also causes the outer peripheral edge portions of the packer which normally encompass parts of the peripheries of the heads, to be forced between the heads and the housing wall thereby effectively sealing the joints between the heads and wall.

The grooves 16 in the packer are not necessary but desirable because they between them provide spaced rings which as radially displaced produce a multiple seal. Under axial compression portions of the packer are displaced into the grooves 21 thus sealing the joints between the stem and packer and those between the confronting sides of the packer and heads.

Owing to the elasticity of the material of which the packer P is made, unscrewing of the nut 20 relieves the packer of the compressing force of the heads H and E so that it is free to contract to its normal diameter thereby permitting the entire sealing device to be removed from the housing.

I will now describe the adaptation of the sealing device to an apparatus for recording bore hole deviation which requires two such sealing devices to be used to seal both ends of the apparatus against the admission of any fluid under great hydrostatic pressure such as exists in all oil bore holes when drilling in order to maintain the parts of the apparatus operable to effect a recordation. Although I have shown and will describe a specific form of such apparatus, it is to be understood that my invention is not limited or restricted to this form of apparatus.

As shown in Fig. 1 the apparatus embodies a tubular housing 30 in which is housed a container 31 for a deviation recording instrument (not shown). To the upper end of the container 31 is connected the lower end of a cylinder 32 containing a piston (not shown) having a rod 33 extending from the upper end of the cylinder and provided with a head 34. This head extends into a socket 35ª formed in the head H of an upper sealing device contained within the housing 30, and the head 34 is secured within the socket by a cross pin 36, all as best shown in Fig. 2. A coiled spring 37 surrounds the rod 33 and is interposed between the head 34 and the cylinder 32.

Within the housing 30 at the lower end of the instrument container 31, is a coiled spring 38 the lower end of which may extend into and by a pin 35 be secured in the socket 36ª of a lower sealing device positioned within the lower end of the housing and identical in construction and operation to the upper sealing device. The aforedescribed piston, cylinder, and springs constitute a shock absorbing means for the recording instrument.

The housing 30 is interiorly screw threaded at its opposite ends as indicated at 39 for the reception of screw plugs 40 and 41, respectively, each of which is formed with a recess 42 shaped to accommodate the stem 17, nut 20 and other parts of the sealing device. The upper plug 40 has secured thereto spring arms 43 which constitute a stabilizer for the housing in its descent in a drill pipe, while the lower plug 41 has screwed into it a connector 44 carrying a spring cushioned spear 45.

Inwardly beyond each threaded portion 39 the housing is formed with an annular shoulder 46 which coacts with a similar shoulder 47 on the head H to form a stop for limiting inward movement of the head.

Displacement of the packer P of either sealing device in effecting a seal of the respective end of the housing 30 against the admission of fluid at extraordinary pressures, say in excess of 2000 lbs. per square inch, is accomplished as follows. Before the respective plug 40 or 41 is applied the nut 20 is screwed as tightly as possible inwardly on the stem 17 thus displacing the packer P until it tightly fits against all surfaces with which it contacts, thus sealing the head H and the stem 17 against the passage of fluid inwardly of the housing.

For manipulating the nut I provide as a part of my invention, a tool which, as shown in Figs. 3 and 4, comprises a wrench for turning the nut and a device for holding the heads H and E and the stem 17 against turning in the housing. The wrench comprises a socket 48 shaped to accommodate the stem and cross pin and to embrace the nut. From the upper end of the socket extends a shank 49 having a handle 50 secured therein by a screw 51. This shank is of less diameter than the socket to form a shoulder 52 at the junction of the two.

The holding device of the tool comprises a sleeve 53 having one internal diameter 53ª in which the socket 48 is rotatably and slidably received, and a smaller diameter 53ᵇ in which the shank 49 is rotatably and slidably received. At the junction of the two diameters a shoulder 54 is formed to be engaged by the shoulder 52 for limiting movement of the sleeve 53 in one direction lengthwise on the wrench. Movement of the sleeve in the other direction lengthwise on the wrench is limited by the handle 50, and thus the wrench and holding device although relative movable axially and circumferentially are inseparable except by removal of the handle.

The inner or lower end of the sleeve 53 is formed at diametrically opposite points with T-shaped slots 55, 55 in which are received projections 56, 56 on the collar 19 to secure the collar and sleeve against turning movement relatively. Thus by holding the sleeve against turning the entire sealing device can be held against turning movement in the housing. The sleeve can be so held by the operator gripping a handle 57 formed on the sleeve by screwing therein a pair of rods.

From a consideration of Fig. 3, it will be clear that the tool is applied to the sealing device by inserting it into the open end of the housing 30 following insertion of the device itself and the elements connected thereto. With the sleeve 53 connected to the collar 19 and the former held against rotation by one hand of the operator, the wrench can be turned by the other hand to screw the nut 20 inwardly on the stem 17 and thus actuate the head E to displace the packer P into such sealing relation to all parts with which it contacts as to prevent admission into the housing of fluids at extraordinarily high pressures. Manifestly, by adjusting both sealing devices in the manner and through use of the one tool, both ends of the housing 30 are effectively sealed to withstand extraordinarily high hydrostatic pressures.

Should the operator for any reason fail to use the tool in securing the requisite adjustment of either sealing device to withstand extraordinarily high hydrostatic pressures, or should it be required to adjust either device to withstand only ordinary hydrostatic pressures, by screwing home the respective plug 40 or 41 into the housing the head E will be engaged by the plug and forced inwardly to a degree sufficient to cause the packer P to effect the requisite sealing action. Thus, there is set up a safety factor which prevents closing of the housing without any sealing adjustment of either sealing device.

Although I have herein shown and described only one form of sealing device and tool therefor embodying my invention, it is to be understood that various changes and modifications may be made herein without departing from the spirit of my invention and the spirit and scope of the appended claims.

I claim:

1. In combination; a tubular housing; a sealing device insertable into the housing including an elastic packer; an inner head at the inner side of said packer, an outer head at the outer side of said packer, a collar on the outer head, a stem on the inner head extending through the packer, outer head and collar, a nut threaded on said stem to engage said collar and move the outer head inwardly to displace the packer into sealing engagement with the housing, stem and heads; coacting means on the housing and head for limiting inward movement of the inner head; and a plug threaded in the housing and having a recess to freely accommodate the stem, nut and collar and yet abut the outer head so that by inward threading of the plug inward movement of the outer head can be effected independently of said nut.

2. In combination; a tubular housing; a sealing device insertable into the housing including an elastic packer; an inner head at the inner side of said packer, an outer head at the outer side of said packer, a collar on the outer head, a stem on the inner head extending through the packer, outer head and collar, a nut threaded on said stem to engage said collar and move the outer head inwardly to displace the packer into sealing engagement with the housing, stem and heads; coacting means on the housing and head for limiting inward movement of the inner head; a plug threaded in the housing and having a recess to freely accommodate the stem, nut and collar and yet abut the outer head so that by inward threading of the plug inward movement of the outer head can be effected independently of said nut; and means on the collar by which a wrench extended into the housing when the plug is removed may be secured to the collar against turning movement while screwing the nut.

3. In combination; a tubular housing; a sealing device insertable into the housing including an elastic packer having a central and non-circular opening therein, an inner head at the inner side of the packer, an outer head at the outer side of the packer, a collar on the outer head, a stem on the inner head having a non-circular portion extending through the opening of the packer, outer head, and collar, a nut threaded on said stem to engage said collar and move the outer head inwardly for displacing the packer; and a plug threaded in the housing and having a recess to freely accommodate the stem, nut and collar and yet abut the outer head so that by inward threading of the plug inward movement of the outer head can be effected independently of adjustment of the nut on the stem.

4. In combination; a tubular housing; a sealing device insertable into the housing including an elastic packer having a central and non-circular opening therein, an inner head at the inner side of the packer, an outer head at the outer side of the packer, a collar on the outer head, a stem on the inner head having a non-circular portion extending through the opening of the packer, outer head, and collar, a nut threaded on said stem to engage said collar and move the outer head inwardly for displacing the packer; a plug threaded in the housing and having a recess to freely accommodate the stem, nut and collar and yet abut the outer head so that by inward threading of the plug inward movement of the outer head can be effected independently of adjustment of the nut on the stem; and means on the collar by which a wrench extended into the housing when the plug is removed may be secured to the collar against turning movement while screwing the nut.

JOE W. CULBERTSON.